US011061514B2

(12) United States Patent
Hiraki et al.

(10) Patent No.: US 11,061,514 B2
(45) Date of Patent: Jul. 13, 2021

(54) TOUCH OPERATED SURFACE

(71) Applicant: MICROSOFT TECHNOLOGY LICENSING, LLC, Redmond, WA (US)

(72) Inventors: Takefumi Hiraki, Beijing (CN); Masaaki Fukumoto, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/612,869

(22) PCT Filed: May 12, 2017

(86) PCT No.: PCT/CN2017/084198
§ 371 (c)(1),
(2) Date: Nov. 12, 2019

(87) PCT Pub. No.: WO2018/205275
PCT Pub. Date: Nov. 15, 2018

(65) Prior Publication Data
US 2020/0167036 A1 May 28, 2020

(51) Int. Cl.
*G06F 3/041* (2006.01)
*G06F 3/043* (2006.01)
(Continued)

(52) U.S. Cl.
CPC .......... *G06F 3/0436* (2013.01); *G06F 3/0418* (2013.01); *G06F 3/0425* (2013.01);
(Continued)

(58) Field of Classification Search
CPC ...... G06F 1/1639; G06F 3/041; G06F 3/0418; G06F 3/042; G06F 3/0425; G06F 3/043;
(Continued)

(56) References Cited

U.S. PATENT DOCUMENTS 7,978,184 B2 7/2011 Morrison
2001/0006006 A1* 7/2001 Hill ...................... G06F 3/0433
73/606

(Continued)

FOREIGN PATENT DOCUMENTS

CN 2611974 Y 4/2004
CN 102289320 A * 12/2011
(Continued)

OTHER PUBLICATIONS

Chou, et al., "Research on Tangible Acoustic Interface and Its Applications", In Proceedings of the 2nd International Conference on Computer Science and Electronics Engineering, Jan. 2013, pp. 913-916.

(Continued)

*Primary Examiner* — Joe H Cheng (57) ABSTRACT

A method provides a touchable user interface based on a surface. The surface supports direct human-machine interactions as conventional touch-sensitive platforms. According to implementations of the method, a mechanical actuator-sensor assembly is arranged at any type of object, and the assembly generates and senses the mechanical wave propagating in the object. In this way, a "touchable" surface can be created.

20 Claims, 7 Drawing Sheets

(51) Int. Cl.
*G06F 3/042* (2006.01)
*G06F 1/16* (2006.01)

(52) U.S. Cl.
CPC .. *G06F 1/1639* (2013.01); *G06F 2203/04105* (2013.01); *G06F 2203/04106* (2013.01)

(58) Field of Classification Search
CPC ............... G06F 3/0436; G06F 3/04883; G06F 2203/04105; G06F 2203/04106
See application file for complete search history.

(56) References Cited

U.S. PATENT DOCUMENTS

| | | | | |
|---|---|---|---|---|
| 2002/0171635 | A1* | 11/2002 | Takahashi | G06F 3/0436 345/177 |
| 2004/0160421 | A1* | 8/2004 | Sullivan | G06F 3/043 345/173 |
| 2006/0139339 | A1* | 6/2006 | Pechman | G06F 3/0436 345/177 |
| 2006/0152499 | A1* | 7/2006 | Roberts | G06F 3/0436 345/173 |
| 2007/0176907 | A1* | 8/2007 | Ishii | G06F 3/0436 345/177 |
| 2009/0273583 | A1* | 11/2009 | Norhammar | G06F 3/0436 345/177 |
| 2010/0283745 | A1* | 11/2010 | Nikolovski | G06F 3/0436 345/173 |
| 2011/0242055 | A1* | 10/2011 | Kim | G06F 3/043 345/175 |
| 2013/0027352 | A1* | 1/2013 | Holloway | G06F 3/0421 345/175 |
| 2013/0233080 | A1* | 9/2013 | Nikolovski | G01N 29/346 73/629 |
| 2014/0247230 | A1* | 9/2014 | Sheng | G06F 3/0416 345/173 |
| 2014/0247249 | A1 | 9/2014 | Smith et al. | |
| 2016/0202724 | A1 | 7/2016 | Chang et al. | |

FOREIGN PATENT DOCUMENTS

| | | |
|---|---|---|
| CN | 102289320 A | 12/2011 |
| CN | 103513499 A | 1/2014 |
| CN | 204066012 U | 12/2014 |
| CN | 106610757 A | 5/2017 |

OTHER PUBLICATIONS

Collins, T., "Active Acoustic Touch Interface", In Journal of Electronics Letters, vol. 45, Issue 20, Sep. 24, 2009, 2 Pages.

Hiraki, et al., "Touchable Wall: Easy-to-Install Touch-Operated Large-Screen Projection System", In Proceedings of the ACM International Conference on Interactive Surfaces and Spaces, Nov. 25, 2018, pp. 465-468.

Kaur, Kalwinder, "Vibration Sensors Making Any Surface an Interactive Platform", Retrieved from: https://www.azosensors.com/article.aspx?ArticleID=242, Jul. 12, 2013, 2 Pages.

Lo, et al., "A Theoretical Study of Impact Localization Limits in Tangible Acoustic Interface Applications", In Journal of Electronics Letters, vol. 45, Issue 16, Jun. 2, 2012, 9 Pages.

Lopes, et al., "Augmenting Touch Interaction Through Acoustic Sensing", In Proceedings of the ACM International Conference on Interactive Tabletops and Surfaces, Nov. 13, 2011, pp. 53-56.

Ono, et al., "Sensing Touch Force using Active Acoustic Sensing", In Proceedings of the Ninth International Conference on Tangible, Embedded, and Embodied Interaction, Jan. 15, 2015, pp. 355-358.

Ono, et al., "Touch & Activate: Adding Interactivity to Existing Objects using Active Acoustic Sensing", In Proceedings of the 26th Annual ACM symposium on User interface software and technology, Oct. 8, 2013, pp. 31-40.

Paradiso, et al., "Passive Acoustic Knock Tracking for Interactive Windows", In Proceedings of ACM Conference on Human Factors in Computing Systems, Apr. 20, 2002, 2 Pages.

Rolshofen, et al., "TAI-CHI: Tangible Acoustic Interfaces for Computer-Human Interaction", In Journal of Advances of Acoustics, vol. 31, Issue 2, Jan. 2005, 5 Pages.

Simonite, Tom, "Acoustic Sensors Make Surfaces Interactive", Retrieved from: https://www.newscientist.com/article/dn10673-acoustic-sensors-make-surfaces-interactive/, Nov. 28, 2006, 2 Pages.

International Search Report and Written Opinion for PCT/CN2017/084198, dated Jan. 31, 2018.

\* cited by examiner

TOUCH OPERATED SURFACE

This application is a U.S. National Stage Application of PCT/CN2017/084198, filed May 12, 2017, which application is hereby incorporated by reference. To the extent appropriate, a claim of priority is made to the above disclosed application.

BACKGROUND

Large-area display has been widely utilized in various fields for the purpose of demonstration or presentation. Meanwhile, with fast development of small and inexpensive projectors, it has become possible to carry a portable projector and directly project the interesting content on a surface (such as a wall of a conference room) in an amplified mode to share the content with others. For example, a user may use a projector to deliver a presentation to the audiences.

Typical projector systems do not support a direct human-machine interaction at the projected user interface (UI) on the surface, because unlike a touch screen or a touch pad, the surface itself does not have any touch-sensitive mechanism. In this case, if the user wants to perform operations or manipulate the contents directly on the projected UI, the user normally needs to hold an additional device wirelessly coupled to another UI, either in the hand or wear it on his/her body. This might be inconvenient especially for those users who may prefer a presentation style that involves pointing to a screen directly with their hands.

SUMMARY

Implementations of the subject matter described herein provide a touchable user interface (UI) based on a surface. The surface supports direct human-machine interactions as conventional touch-sensitive platforms. According to implementations of the subject matter described herein, a mechanical wave (such as an acoustic wave) actuator-sensor assembly is arranged at any type of surface, and the assembly generates and senses the mechanical wave propagating in the object. In this way, a "touchable" surface can be created. Then, touches on the surface can be detected through the characteristics of the mechanical wave conveyed in the object. By means of the touch-sensitive mechanism "actively" created by the actuator-sensor assembly, the user can trigger events on the surface by straightforwardly applying an intuitive touch operation on the surface, in a similar way as triggering events on a typical touch pad or a touch screen.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The above and other objectives, features and advantages of the subject matter described herein will become more apparent through more detailed depiction of example implementations of the subject matter described herein in conjunction with the accompanying drawings, wherein in the example implementations of the subject matter described herein, same reference numerals usually represent same components.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

For the ease of illustration, a touch-operated surface according to implementations of the subject matter described herein is described with reference to a projector system. However, this is merely for illustration without suggesting any limitations as to the scope of the subject matter described herein. It is to be noted that other usage scenarios of the touch-operated system 1000 have also been envisaged, which will be described later.

Figure 1:
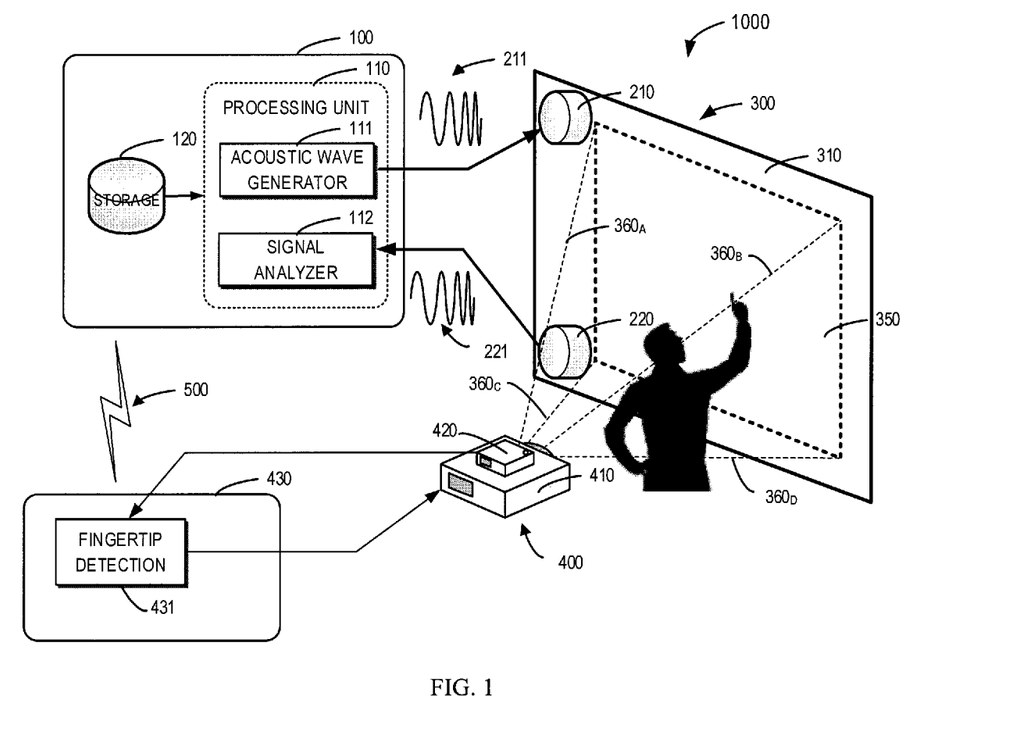
FIG. 1 is a schematic configuration of an example projection system equipped with a touchable surface according to an implementation of the subject matter described herein.

FIG. 1 shows an overview of an example touch-operated system 1000 according to implementations of the subject matter described herein. In this example, without suggesting any limitations as to the scope of the subject matter described herein, the touch-operated system 1000 is a projector system. Moreover, the mechanical wave throughout this disclosure is described as an acoustic wave, and the corresponding mechanical wave actuator-sensor assembly throughout this disclosure is described as an acoustic actuator-sensor assembly. Any other type of mechanical wave which oscillates the medium in which the mechanical wave propagates is also possible.

As shown, the touch-operated system 1000 includes an object 300 with a large-area projecting surface 310, and an actuator 210 and a sensor 220 (sometimes referred to as an actuator-sensor assembly 200) are arranged in proximity to the surface 310 of the object 300. In this example, the actuator 210 and the sensor 220 are separately attached on the surface 310 of the object 300. However, it is to be noted that the locations of the actuator 210 and the sensor 220 are only schematic, and they can be arranged at other locations on the surface 310 per request, which will be mentioned later.

The system 1000 further includes a device 100 (sometimes referred to as a control unit). The device 100 includes a processing unit 110 and a memory 120 coupled to the processing unit 110. The device 100 can be programmed or configured to execute the instructions stored in the memory 120 to control operation of the actuator 210 via an acoustic wave generating signal 211. With the received signal 211 as an input, the actuator 210 generates desired type of acoustic wave as an output. On the other hand, the device 100 receives the signal 221 from the sensor 220 and determines, based on the received signal 221, whether a touch is applied on the surface 310 and further the properties of the touch on the surface.

In this example, the system 1000 further includes a projector-camera system 400. The projector 410 is operable to project the interesting content on the surface 310 of the object 300. The camera 420 that is integrated with the projector 410 in this example is used to perform fingertip detection through various image-processing techniques, which improves the accuracy of the determination of the touch position. Accordingly, in this example, the system 1000 also includes the communication link 500, such as optical or wireless communication path, between the device 100 and the projector-camera system 400, so that the device 100 and the projector-camera system 400 can communicate with each other to enable the cooperation in between.

It is to be noted that the projector-camera system 400 is not always required. In some implementations, only the acoustic wave based touch operated surface is sufficient to detect touch property and trigger the corresponding event or action accurately. Some of those implementations without using the projector-camera system 400 will be described later.

For ease of discussions, now some fundamental principles of operations of touch-operated system 1000 described herein will be described with reference to FIG. 2A and FIG. 2B.

Generally, in various implementations of the subject matter described herein, the change in the elastic compliance is utilized to identify whether a touch is applied on the surface. As known, each object has a unique elastic compliance that depends on its shape, material and boundary conditions. The load and the constraints on the object determine the boundary condition, and these parameters change depending on the position and pressure of the touch. Therefore, the elastic compliance of an object changes with a touch applied on the object, because the shape and the material of an object do not change within a short time period.

Figure 2A:
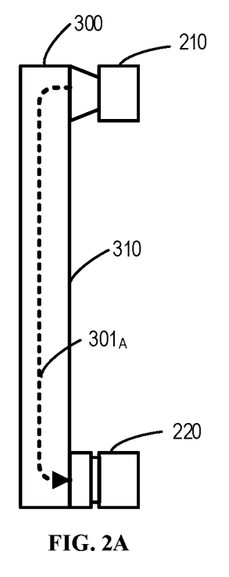
FIG. 2A shows a schematic view of a touchable surface that is not touched according to an implementation of the subject matter described herein.
Figure 2B:
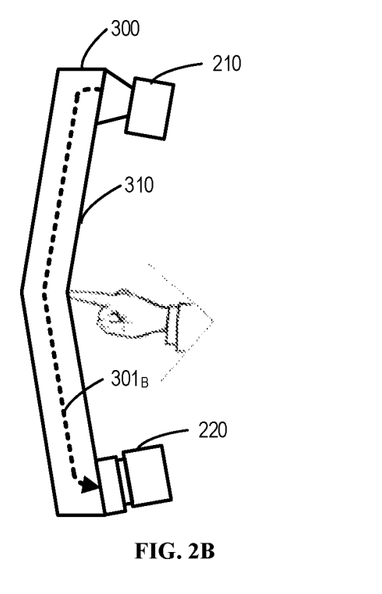
FIG. 2B shows a schematic view of the touchable surface of FIG. 2A that is touched according to an implementation of the subject matter described herein.

FIG. 2A and FIG. 2B schematically illustrate the object 300 when no touch is applied, and the object 300 when a touch is applied on the surface 310, respectively. In order to build a touchable UI on the object 300 based on the changing elastic compliance, according to implementations of the subject matter described herein, an actuator 210 is arranged in the proximity of the surface 310 of the object 300 and used to generate an acoustic wave in the object 300. Further, a sensor 220 is also arranged in the proximity of the surface 310 of the object 300 and used to collect the acoustic wave propagating in the object 300 and convert the received acoustic wave to the measurable signal.

As discussed above, a touch would lead to the change of the elastic compliance of object 300. Now, with the generated acoustic wave conveyed in the object 300, the change of the elastic compliance of the object would inevitably affect the propagation path of the acoustic wave. FIG. 2A and FIG. 2B schematically illustrate the change in the propagation path $301_A$, $301_B$ (collectively referred to as propagation path(s) 301) of the acoustic wave conveyed in the object 300 upon a touch is applied on the object 300.

Figure 2C:
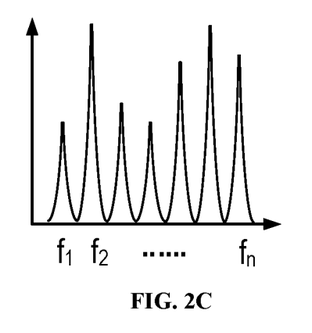
FIG. 2C schematically shows a pattern of the detected signal when the surface is not touched as depicted in FIG. 2A.
Figure 2D:
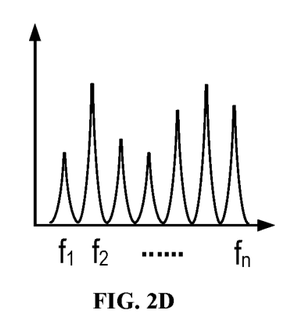
FIG. 2D schematically shows a pattern of the detected signal when the surface is touched as depicted in FIG. 2B.

The change of propagating path 301 of the acoustic wave in the object 300 further results in a change in the characteristics of the acoustic wave, which in turn leads to the change in the pattern of the signal. The pattern of the signal is related to the intensity and the frequency of the signal. FIG. 2C and FIG. 2D schematically show the patterns of the detected signal when no touch is applied (shown in FIG. 2A) and when a touch is applied (shown in FIG. 2B), respectively, in frequency domain, that is, the frequency spectra of the signal. In each case, each peak of the spectra corresponds to a frequency component (labeled as $f_1, f_2, \ldots, f_n$).

As such, given the pattern of the signal, the processing unit 110 of the device 100 can determine whether a touch occurs on the surface 310, and then further determine the touch position and/or the touch pressure on the surface 310. Consequently, the device 100 can trigger a corresponding functionality or event based on the touch position and/or pressure, thereby providing the user with an intuitive manner for interacting with the machine via the projected UI on the surface 310.

Compared to some conventional solutions in which optical sensors or ultrasonic sensors are used, the touch-operated system 1000 according to implementations of the subject matter described herein detects the touch at a time when it actually occurs on the surface 310. This means, a "true" touch can be detected with a haptic feedback to the fingertip of the user. Instead, those optical sensor or ultrasonic sensor based solutions normally detect whether the user's hand or any other touch tool (such as pen and stylus) shields the space very close to the surface.

Further, in some conventional solutions based on surface acoustic waves, capacitive touch screen film sheet, or resistive film sheet on a special glass or sheet are required. Accordingly, the installation of the film sheet is difficult, especially when the operation surface is large, such as 100 inches. On the contrary, the touch-operated system 1000 according to implementations of the subject matter described herein does not require for example the glass or sheet across the entire operation surface, which eases the fabrication or preparation of the surface.

The inventors have found that any type of object, in principle, can be used to build such touch-sensitive mechanism. Specifically, in some implementations, the object 300 can be made of various materials, such as concrete, glass, wood, mortar, plastic and so on. In some implementations, the surface area of the object 300 may vary in a broad range, for example, in a range of 10 inches to 100 inches. In some implementations, the orientation of the object 100 may also vary depending on the usage scenarios. As such, examples of object 300 may include, but not limited to, a wall of a conference room, a door of an apartment, a wall-hanging board, and a horizontal desktop, a window-glass, and a floor or a ceiling.

In some implementation, the actuator 210 and the sensor 220 (or the actuator-sensor assembly 200) can be pasted on the surface of the object 300 via suction cups. With such suction cups, a quick and firm installation can be achieved. Further, compared to conventional built-in actuator-sensor assemblies in the some conventional objects, such easily attachable and detachable actuator-sensor assembly enhances the compatibility among different surfaces.

In some implementations, the actuator 210 can be selected from contact speaker, piezo-electric component, and a giant-magnetistctive-material (GMM) component.

Accordingly, in some implementations, the sensor 220 can be selected from contact microphone, piezo-electric component, and GMM component.

In some implementations, the actuator 210 is configured to generate high vibration acoustic energy, such as 20 W, to guarantee detectable signal intensity at the sensor 220, since the acoustic vibration energy sometimes would be attenuated rapidly in particular materials. This is especially beneficial for the case that the sensor 220 is mounted far away from the actuator 210 in a large-area surface, such as 100 inches.

Figure 3:
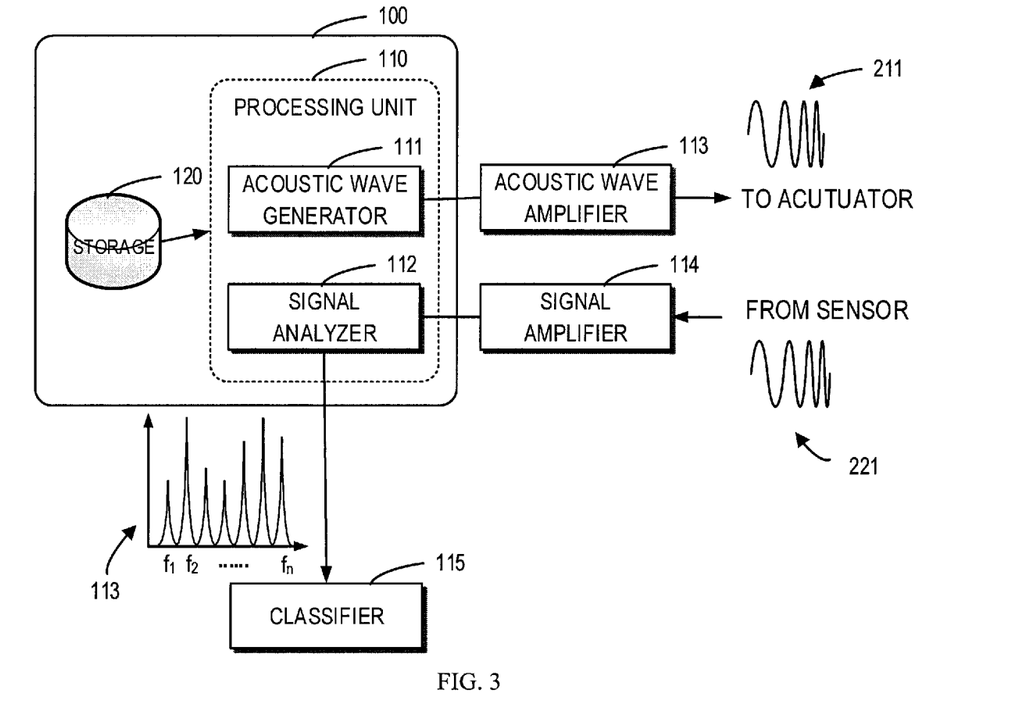
FIG. 3 illustrates a block diagram of an example implementation of the device in which one or more implementations of the subject matter described herein may be implemented.

Alternatively, or in addition, as illustrated in the implementation of FIG. 3, an acoustic amplifier 113 and a signal amplifier 114 be provided as external components and coupled to the actuator 210 and the sensor 220, respectively. In this way, the acoustic amplifier drives 113 the actuator 210, and the signal amplifier 114 amplifies the weak signal collected from the sensor 220. In some implementations, the acoustic amplifier 113 and the signal amplifier 114 can be components (or circuits) integrated within device 100.

Alternatively, or in addition, the system 1000 may further include a filter (not shown) which is configured to reduce or even eliminate the noise from the signal. In some implementations, such filter can be integrated within the signal amplifier 114.

Alternatively, or in addition, the processing unit 110 of device 100 as shown in FIG. 3 may further include a signal analyzer 112 to perform analyses or evaluations to the detected signal. In some implementations, the signal analyzer 112 can be a fast Fourier transform (FFT) analyzer, which converts the signal 221 measured from the sensor 220, especially the amplified signal to a frequency spectrum by using FFT. This advantageously provides robustness to noise, especially when the signal-to-noise ratio (SNR) associated with the measured signal is low.

Accordingly, in some implementations, in some implementations as shown in FIG. 3, the processing unit 111 also includes an acoustic generator 111. In this case, based on the received instructions or commends from the acoustic generator 111, the actuator 210 may generate an acoustic wave having a plurality of frequency components within the inaudible range of frequencies. This is beneficial, because people normally cannot hear the sound in the inaudible range, and thus will not be bothered by the generated acoustic wave in such frequency range.

In addition, such acoustic wave having multiple frequency components, after the FFT, will have rich spectral information, that is, multiple frequency components $f_1$, $f_2$, ..., $f_n$ as shown in FIG. 3, which will facilitate in distinguishing one signal pattern from the other, thereby enabling the identification of multiple touch properties. This is because two touch operations with even a slight difference (in terms of position and/or pressure) can still be distinguished by comparing each of multiple peaks (for example, the relative height and peak shift).

In an example implementation, the acoustic signal provided by the acoustic wave generator is a chirp signal within a range of 16 kHz to 20 kHz. FIG. 3 schematically shows the chirp signal in which the frequency increases (or decreases) with time. It is to be understood however that this example suggests no limitation as to the scope of the subject matter described herein, and any type of signal (as well as any type of acoustic wave) suitable in the identification of touch properties can be used.

Figure 4A:
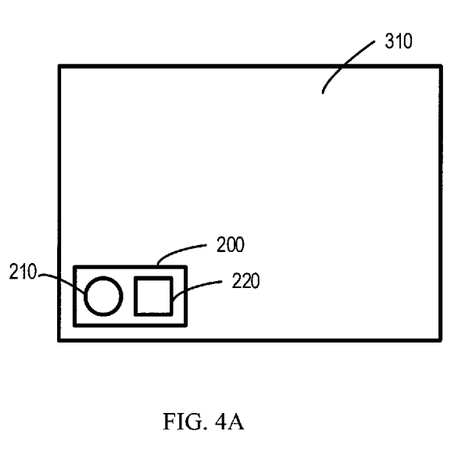
FIG. 4A illustrates a schematic actuator-sensor assembly integrated within a single unit according to an implementation of the subject matter described herein.

In some implementations as shown in FIG. 4A, the actuator 210 and the sensor 220 can be integrated within one unit 200, as an actuator-sensor assembly 200, and mounted on the surface 310. Mounting one unit 200 on the surface reduces the installation difficulty, and meanwhile increases the integrity of the assembly 200.

Figure 4B:
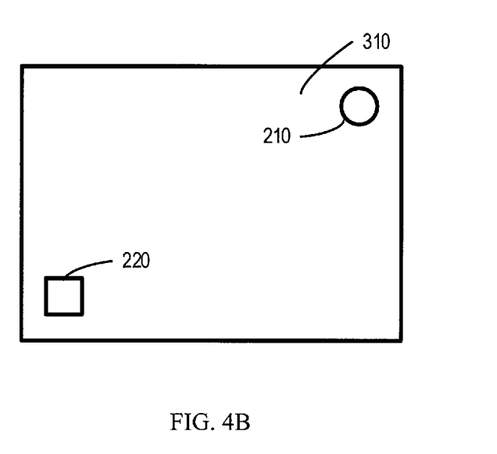
FIG. 4B illustrates a schematic actuator-sensor assembly separately distributed on the surface according to an implementation of the subject matter described herein.

In some other implementations as shown in FIG. 4B, the actuator 210 and the sensor 220 are arranged separately on the surface 310. As shown in the example of FIG. 4B, the actuator 210 and the sensor 220 are arranged diagonally and apart from each other. With the separately arranged actuator 210 and sensor 220, the touch can be identified easily due to the distance between the two components. It is still to be understood that this example arrangement of the actuator 210 and the sensor 220 suggests no limitation as to the scope of the subject matter described herein, and any suitable arrangement can be envisaged according to requirements.

Moreover, with an increased number of the actuator-sensor assemblies 200 on the surface 310, the detection accuracy may be increased. However, the large number of actuator-sensor assemblies 200 would increase the effort for the installation. Therefore, in some implementations, one or two actuator-sensor assemblies 200 are mounted as a trade-off design between "detection accuracy" and "easy installation."

It is to be noted that when the sensor output patterns are well trained (that is, there are enough learning samples for the pattern training/recognition), only one actuator-sensor assembly may be sufficient to detect the property of the touch on the surface. Compared to the conventional location determination solutions where multiple sensors are required to detect and compare the energy of the propagated wave received by each sensor, the signal pattern-based detection mechanism according to the subject matter described herein, can reduce the number of actuator-sensor assemblies, and thereby reducing the cost.

However, it is to be noted that in those implementations where one or two actuator-sensor assemblies 200 symmetrically arranged on a symmetrical surface 310, such a rectangular surface, the system 1000 may additionally include a fixing or mounting component 320 that is also arranged in the proximity of the surface 310 of the object 300 for artificially introducing asymmetry to the symmetrical surface 310 of the object 300.

Figure 5A:
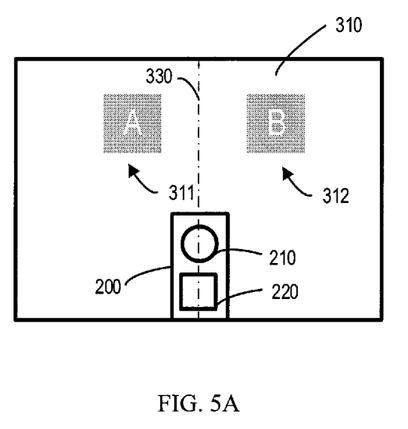
FIG. 5A shows two symmetrical regions with respect to the middle symmetrical axis of the surface, with the integrated the actuator-sensor assembly of FIG. 4A arranged at the middle bottom portion.

FIG. 5A shows such a symmetrical (which is rectangular in this example) object 300, with two marked regions "A" 311 and "B" 312 symmetrically located at two side of the symmetrical axis 330 (labeled by the dash dot line) of the surface. In this sample, the one unit actuator-sensor assembly 200 is mounted at the symmetrical axis 330 at the bottom region of the surface. In this case, the one unit assembly 200 cannot differentiate a touch applied on the region "A" 311 from a touch applied on the region "B" 312. In addition, in such symmetrical arrangement of actuator-sensor assembly 200 on the symmetrical surface 310, standing waves (not shown) are likely to stand in a specific position.

Figure 5B:
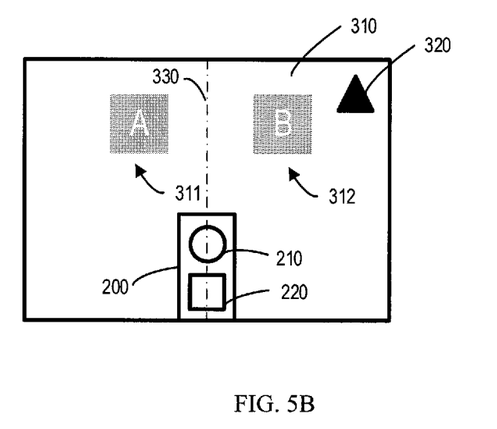
FIG. 5B shows the surface as shown in FIG. 5A, with a fixing component mounted at the upper right region.

In order to solve these problems, in an implementation as shown in FIG. 5B, a fixing components 320 can be mounted for example on the upper right corner of the rectangular surface, to break the symmetrical geometry of the surface. In some implementations, the position of the actuator-sensor assembly 200, and the position and the shape of the fixing components 320 can be further optimized to suppress the generation of standing waves as discussed above.

Figure 5C:
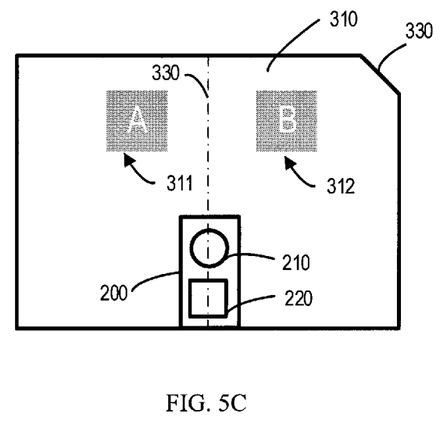
FIG. 5C shows a surface, with a flat corner at the upper right region.

In some implementations as shown in FIG. 5C, instead of a fixing component 320 as mounted in the example of FIG. 5B, the asymmetry of the surface 310 can be introduced by creating a flat corner 330 of the object 300 (that is, removing the right-angled corner). Although such asymmetrical shape may be difficult to be achieved on a wall or a door, it can still be possibly achieved in some objects that are easy to modify, such as a soft board for pasting a poster.

Figure 5D:
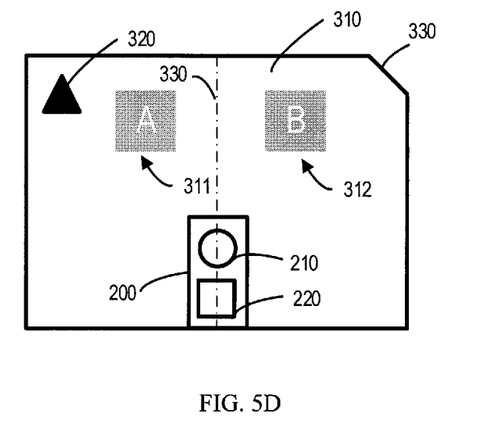
FIG. 5D shows a surface, with a fixing component mounted at the upper left region and a flat corner at the upper right region.

In some implementations as shown in FIG. 5D, multiple types of asymmetry can be simultaneously introduced onto a same surface. As shown in FIG. 5D, the object includes both a flat corner 330 as shown in FIG. 5C and a fixing component 320 as shown in FIG. 5B.

Figure 5E:
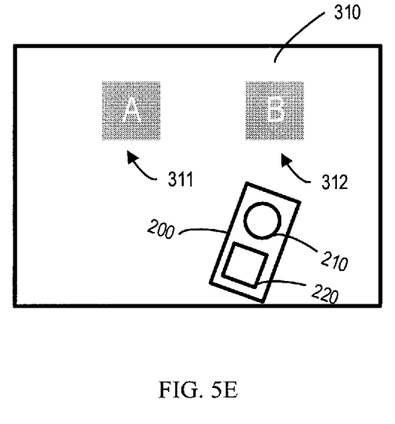
FIG. 5E shows an example position and orientation of the actuator-sensor assembly on a surface.
Figure 5F:
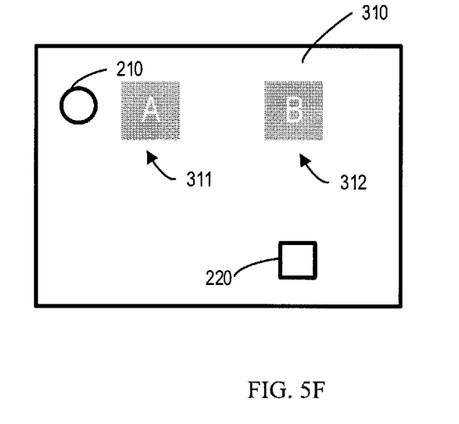
FIG. 5F shows another example position and orientation of the actuator-sensor assembly on a surface.

FIG. 5E and FIG. 5F show some other implementations. In FIG. 5E, the position and orientation of the actuator-sensor assembly 200 is selected for reducing "symmetrical" condition. FIG. 5F also can reduce "symmetrical" condition with separated placement of actuator 210 and sensor 220.

Basically, different touch operations may generate different sensor output sequences (or "patterns"). In this way, any available pattern recognition techniques for time-synchronized multiple signals can be used as a classifier (for example, machine learning).

Therefore, in some implementations, triggering an event includes determining, based on the pattern of the signal, a region from multiple regions on the object 300, each of many regions is associated with at least one pattern, and then the event is triggered based on the determined region.

In the case, continuing to refer to FIG. 3, the device 100 may further include or be coupled with a classifier 115 to group/cluster multiple patterns having similar characteristics. For example, multiple similar patterns may together define a region of a surface 310. Those patterns in the region are previously learnt from some touch operations applied within that region.

In some implementations, as long as the detected pattern has a certain similarity with any of the previously learnt and stored patterns indicating the same region, it might be enough to trigger a specific event corresponding to this region, without requiring the received pattern to be exactly matched with at least on learnt pattern within that region.

It is to be understood that the property of a surface that is to be used to create the touchable UI sometimes is unknown to the user. Therefore, in some implementations, for each use of the touch-operated system, a calibration process might be needed after the installation process of the actuator-sensor assembly 200 on the surface 310.

Figure 6:
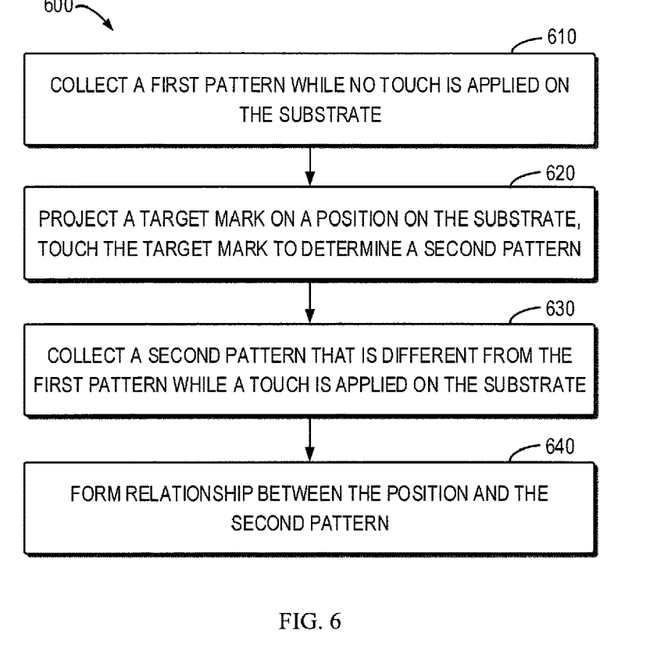
FIG. 6 shows a flowchart of an example calibration process according to an implementation of the subject matter described herein.

FIG. 6 shows a flowchart of an example calibration process 600 according to example implementations of the subject matter described herein. As shown in FIG. 6, at 610, the state in which no touch operation is applied on the surface 310 is first collected. In this case, a first pattern (as the reference pattern) of the signal indicating no touch being applied can be achieved. In some cases, the first pattern is not collected until a short time period has elapsed.

At 620, a target mark is projected on a position of the surface. At 630, upon a touch operation is applied on the position, the touch position associated with the projected target mark is collected for the position calibration, and meanwhile the specific second pattern indicating the touch being applied on that position can be achieved. The above procedure is then repeated several times with different mark positions on the surface. At 640, a relationship between the positions and the corresponding second patterns are formed, which can be stored and used to train the classifier 115.

In order to establish a complete database, in some implementations, the method as described in FIG. 6 can be performed with respect to many other parameters, such as, different touch pressures, different wall types, and different wall sizes. In addition, in some implementations, this above study can also be conducted among different participants.

In an example implementation, when a user touch the left region or right region of the projected area 350 as shown in FIG. 1, a flipping slide operation may be performed. As another example, when the user touch the bottom region of the projected area 350, a double-click operation may be performed. Of course, the surface 310 can be further divided into more regions, such as five, ten, twenty, and so on, depending on the specific requirements of the user or the applications. Accordingly, different events can be assigned to different regions defined by the surface 310.

In another example implementation, instead of the projected area 350, the user can touch some predefined positions on a poster printed or pasted on an object 300, such as a Styrofoam board. In this case, a comment sound can be reproduced from a speaker when a user touches a specific area on the poster, or a character's voice may be reproduced when the user touches the illustration panel.

In another example implementation, the actuator-sensor assembly 200 can be attached on the desk (or behind the desk). In this case, it is possible to detect position of stationaries. In another example implementation, the device can be attached on the chair or bed. In this case, it is possible to detect posture of the user.

In another example implementation, the actuator-sensor assembly 200 can be attached on the floor (or behind the floor). In this case, it is possible to detect position of user or furniture on the floor. Moreover, it is even possible to detect "who" is on the floor. This is because when the user's body directly contacts the floor, the generated acoustic wave will also at least partially propagate through the user's body. In this case, the signal pattern is not only affected by the weight of the user, but may also be affected by his/her shoes and clothes as well as the user's body structure, for example, the ratio of muscle and fat of the user.

In some implementations, the touch is a part of a gesture, and the triggering the event based on the determined region includes determining, from multiple regions, at least one previous region in which at least one previous touch is applied, and the at least one previous touch is a previous part of the gesture. Then the event is triggered based on the determined region and the at least one previous region.

Figure 7:
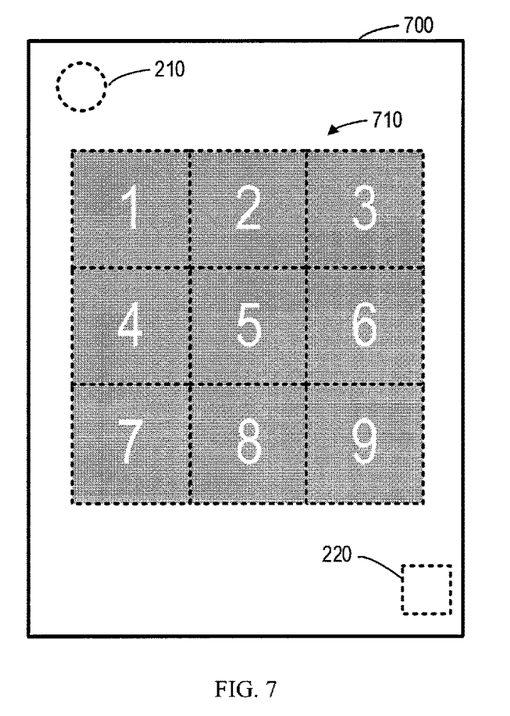
FIG. 7 shows an example touchable door equipped with the separate actuator-sensor assembly according to implementations of the subject matter described herein.

In an example implementation, the touchable UI described as above can be directly created on a normal door 700 of an apartment without requiring a projector system as shown in FIG. 1. In this case, a gesture may define a PIN number to lock/unlock the door. In this implementation, the touch-operated system 1000 (or the actuator-sensor assembly 200) can be installed by embedding the developed units on the back side of the door 600, because sound vibration is transmitted irrespective of whether it originates on the front side or the back side of the door. FIG. 7 illustrates such door lock system with nine predefined but invisible regions from outside (labeled by numbers "1", "2", . . . , "9", and collectively referred to as 710), and the actuator 210 and the sensor 220 are also invisible from outside as mentioned above. The invisible contents or components in FIG. 7 are indicated by the dashed lines.

In this way, the landscape is not impaired, and the security is enhanced because the door itself serves as the input area of the PIN number, and the touch-operated system (or the actuator-sensor assembly 200) is not exposed to outside. Now, when a user is using such system to lock/unlock the door, it seems that the user is only "randomly" touching different regions of the door 700.

Referring back to FIG. 1, in some implementation, the touch-operated system 1000 may further includes a projector-camera subsystem 400. The area indicated by the dashed box defines the projected area 350 on the surface 310, and four dotted lines 360$_A$, 360$_B$, 360$_C$ and 360$_D$ (collectively referred to as "360") represent projection lines emitting from the projector 410.

In some implementations where a high accuracy of the touch position detection is required, such projector-camera subsystem 400 may be helpful. Because, such system 400 may use imaging processing techniques to detect the fingertip of the user accurately.

In some implementations as shown in FIG. 1, the device 100 provides information indicating that the touch is applied on the object 300 to a controller 430 of the camera 420, to enable the camera 420 to determine the location of the fingertip that applies the touch on the object. For example, the camera 420 may include a depth sensor (not shown) for continuously tracking user's fingertip. In some implementations, the fingertip recognition can be implemented using depth data collected form the depth sensor and based on the machine-learning provided in the fingertip detection unit 431 as shown in FIG. 1.

With the recognized fingertip position, the controller 430 of the camera 420 then may send an indication of the location of the fingertip to back the device 100. After the device 100 receiving the indication of the fingertip location via the communication channel 500, the position of the touch on the surface 310 determined by the acoustic wave based detection described as above, is updated to an updated position based on the received indication. Finally, based on the updated and actually more accurate position, the corresponding event will be triggered.

In some implementations, with such determined fingertip position, the cursor displayed on the surface 310 for example may continuously follow the user's hand. In this case, system can be used as ordinary pointing devices such as a mouse or a pointing stick.

Figure 8:
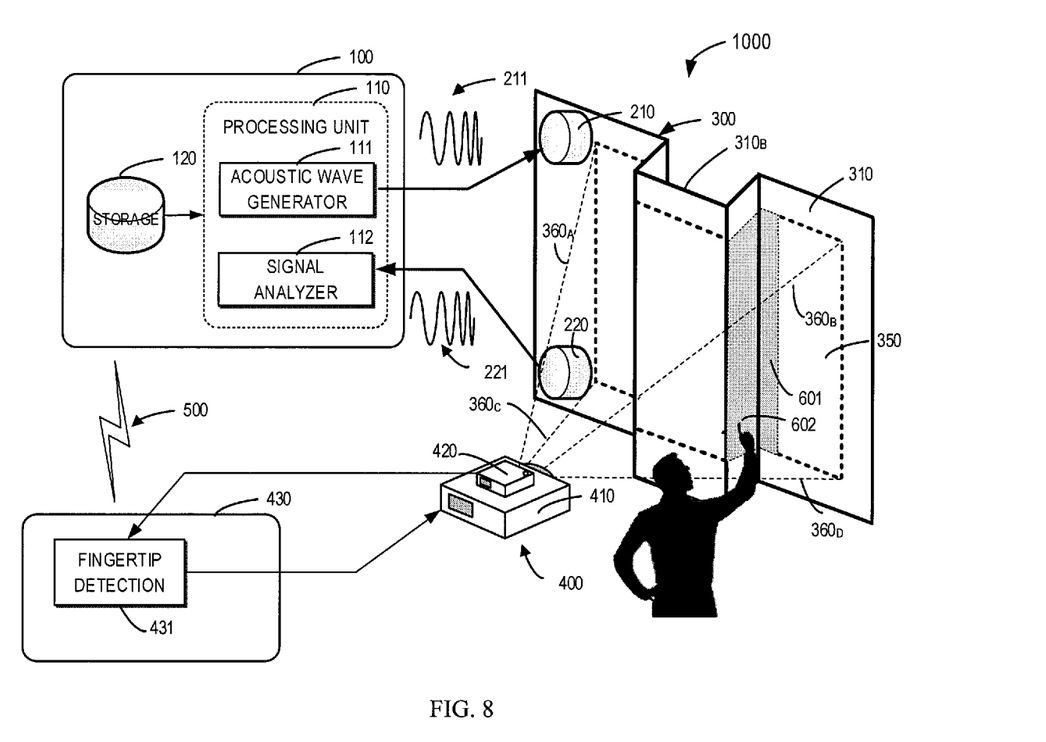
FIG. 8 shows a schematic configuration of another example projection system equipped with a non-flat touchable surface according to an implementation of the subject matter described herein.

FIG. 8 shows another example of implementation with non-flat surfaces for enabling touch-based interaction with projection mapping application. As shown, a large-area projecting surface 310 has curved or non-flat area 310B. Therefore, projected area 350 may have distorted or discontinuous area. For example, there is no image projected on the hatched area 601 due to it is "shadow" area from the projector 410. The camera 420 also cannot capture pointing location 602 if it is in the shadowed area 601. Conventional camera-based interaction system that detects pointing location only by the camera 420, therefore, it cannot detect pointing action 602 in the shadowed area 601. On the other hand, proposed system can detect pointing action 602 in the shadowed area 601 by using acoustic-based detection mechanism.

In some implementations, from the pattern of the signal, the pressure information of the touch on the object 300 can also be achieved. By using the pressure information applied on the surface 310, in some implementations, a different event can be triggered based on pressure in addition to the 2D position. With the pressure information in addition to the position information, more complex actions can be achieved.

In an example implementation, users may allow to view sequential brain magnetic resonance imaging (MRI) scans using the touch-operated system 1000 described as above. A user can efficiently browse images on the surface 310 by manipulating them in the x and y directions by a normal touch (with for example 0.75 kgf touch pressure), and on the other hand, the user can zoom in the image in the z direction by a hard touch (with for example 2.98 kgf touch pressure). Of course, a touch pressure can be further classified into more than two levels, according to the specific applications or requirements from the users.

In another example implementation in which a user can switch action of the application with touch pressure, the user can view and manipulate a map image in the x and y directions by a normal touch, and on the other hand, the user can obtained a detailed picture by using a hard touch.

Figure 9:
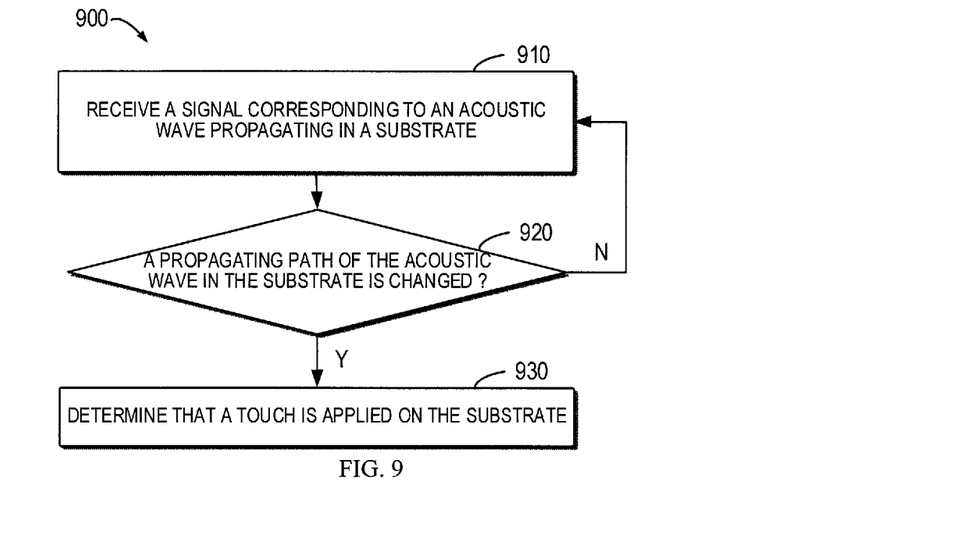
FIG. 9 illustrates a flowchart of a computer-implemented method for detecting a touch operation on the touch surface of an object in accordance with one implementation of the subject matter described herein.

FIG. 9 illustrates a flowchart of a computer-implemented method 800 for detecting a touch operation on the touch surface 310 of an object 300 in accordance with one implementation of the subject matter described herein.

As shown in FIG. 9, at 910, a signal corresponding to an acoustic wave propagating in an object is received. At 920, whether a propagating path of the acoustic wave in the object is changed is determined by detecting a pattern of the signal. The pattern of the signal is related to at least one of an intensity and a frequency of the signal. At 930, in response to determining that the propagating path of the signal is changed, a touch that is applied on the object is determined.

Figure 10:
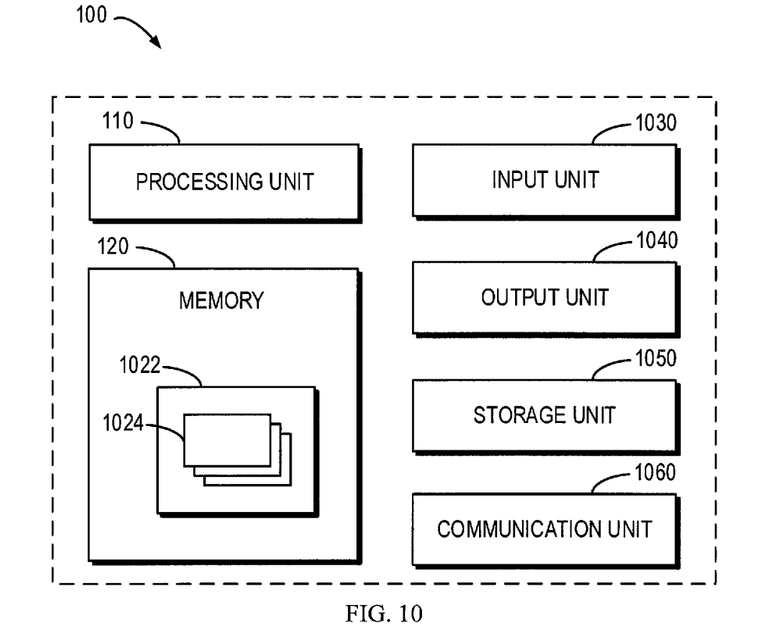
FIG. 10 illustrates a block diagram of an example implementation of the electronic device in which one or more implementations of the subject matter described herein may be implemented.

Hereinafter, an example implementation of the device 100 is shown in FIG. 10. In this example, the electronic device 100 is in a form of a general-purpose computing device.

Components of the electronic device 100 may include, but are not limited to, one or more processors or processing units 110, a memory 120, one or more input devices 1030, one or more output devices 1040, storage 1050, and one or more communication units 1060. The processing unit 110 may be a real or a virtual processor and is capable of performing various processes in accordance with a program stored in the memory 120. In a multi-processing system, multiple processing units execute computer-executable instructions to increase processing power.

The electronic device 100 typically includes a variety of machine readable medium. Such medium may be any available medium that is accessible by the computing system/server, including volatile and non-volatile medium, removable and non-removable medium. The memory 120 may be volatile memory (e.g., registers, cache, a random-access memory (RAM)), non-volatile memory (e.g., a read only memory (ROM), an electrically erasable programmable read only memory (EEPROM), a flash memory), or some combination thereof. The storage 1050 may be removable or non-removable, and may include machine readable medium such as flash drives, magnetic disks or any other medium which can be used to store information and which can be accessed within the electronic device 100.

The electronic device 100 may further include other removable/non-removable, volatile/non-volatile computing system storage medium. Although not shown in FIG. 10, a disk driver for reading from or writing to a removable, non-volatile disk (e.g., a "floppy disk"), and an optical disk driver for reading from or writing to a removable, non-volatile optical disk can be provided. The memory 120 may include at least one program product having a set (e.g., at least one) of program modules that are configured to carry out the functions of various implementations of the subject matter described herein.

A program/utility tool 1022 having a set (at least one) of the program modules 1024 may be stored in, for example, the memory 120. Such program modules 1024 include, but are not limited to, an operating system, one or more applications, other program modules, and program data. Each or a certain combination of these examples may include an implementation of a networking environment. The program modules 1024 generally carry out the functions and/or methodologies of implementations of the subject matter described herein, for example, the method 600 and method 800.

The input unit(s) 1030 may be one or more of various different input devices. For example, the input unit(s) 1030 may include a user device such as a mouse, keyboard, trackball, a pointing stick, etc. The input unit(s) 1030 may implement one or more natural user interface techniques, such as speech recognition or touch and stylus recognition. As other examples, the input unit(s) 1030 may include a scanning device, a network adapter, or another device that provides input to the electronic device 10. The output unit(s) 1040 may be a display, printer, speaker, network adapter, or another device that provides output from the electronic device 10. The input unit(s) 1030 and output unit(s) 1040 may be incorporated in a single system or device, such as a touch screen or a virtual reality system.

The processing unit 110 can detect the user's touch on the surface 310 of the object 300 by using the pattern of the signal. Upon detecting the user's touch, the processing unit 110 can trigger different events in response to different positions of the touch surface being touched. Generally, all the methods described herein can be implemented by the processing unit 110.

The communication unit(s) 1060 enables communication over communication medium to another computing entity. Additionally, functionality of the components of the electronic device 100 may be implemented in a single computing machine or in multiple computing machines that are able to communicate over communication connections. Thus, the electronic device 100 may operate in a networked environment using logical connections to one or more other servers, network personal computers (PCs), or another common network node. By way of example, and not limitation, communication media include wired or wireless networking techniques.

The electronic device 100 may also communicate, as required, with one or more external devices (not shown) such as a storage device, a display device, and the like, one or more devices that enable a user to interact with the electronic device 100, and/or any device (e.g., network card, a modem, etc.) that enables the electronic device 100 to communicate with one or more other computing devices. Such communication may be performed via an input/output (I/O) interface(s) (not shown).

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Hereinafter, some example implementations of the subject matter described herein will be listed.

In some implementations, there is provided a device. The device comprises: a processing unit; and a memory coupled to the processing unit and storing instructions thereon, the instructions, when executed by the processing unit, cause the device to perform acts including: receiving a signal corresponding to an mechanical wave propagating in an object; determining whether a propagating path of the mechanical wave in the object is changed by detecting a pattern of the signal, the pattern of the signal being related to at least one of an intensity and a frequency of the signal; and in response to determining that the propagating path of the signal is changed, determining that a touch is applied on the object.

In some implementations, the acts further comprising: causing an actuator to generate the mechanical wave propagating in the object.

In some implementations, the causing an actuator to generate the mechanical wave comprises: causing the actuator to generate the mechanical wave having a plurality of frequency components in a range of 16 kHz to 20 kHz.

In some implementations, the acts further comprising: determining a property of the touch from the pattern of the signal, the property at least indicating a first position of the touch applied on the object; and triggering an event at least based on the first position of the touch.

In some implementations, the property further indicates a pressure of the touch on the object, and the triggering an event comprises: triggering the event based on the first position and the pressure of the touch.

In some implementations, the triggering an event comprises: determining, based on the pattern of the signal, a region from a plurality of regions on the object, each of the plurality of regions being associated with at least one pattern; and triggering the event based on the determined region.

In some implementations, the touch is a part of a gesture, and the triggering the event based on the determined region comprises: determining, from the plurality of regions, at least one previous region in which at least one previous touch is applied, the at least one previous touch being a previous part of the gesture; and triggering the event based on the determined region and the at least one previous region.

In some implementations, the act further comprising: providing information about the touch applied on the object to a controller of a camera, to enable the camera to determine a location of a touch tool that applies the touch on the object.

In some implementations, the triggering the event comprises: receiving an indication of the location of the touch tool from controller of the camera; calibrating the first position of the touch on the object to a second position based on the received indication; and triggering the event based on the second position.

In some implementations, there is provided a touch-operated system, the system comprises: an actuator configured to generate an mechanical wave propagating in an object; and a sensor configured to detect a change of a propagating path of the mechanical wave in response to a touch applied on the object; generating a signal representing the detected change of the propagating path of the mechanical wave; and provide the signal to the device according to implementations of the subject matter described herein.

In some implementations, the actuator configured to generate the mechanical wave having a plurality of frequency components within a range of 16 kHz to 20 kHz.

In some implementations, the actuator is selected from a group consisting of: a contact speaker; a piezo-electric component; and a giant-magnetistctive component.

In some implementations, the actuator and the sensor are detachably arranged on a surface of the object.

In some implementations, the actuator and the sensor are arranged separately on the surface of the object.

In some implementations, the system further comprises: a fixing component arranged in a proximity of the surface of the object for introducing asymmetry to the surface of the object.

In some implementations, there is provided a computer-implemented method. The method comprises: receiving a signal corresponding to an mechanical wave propagating in an object; determining whether a propagating path of the mechanical wave in the object is changed by detecting a pattern of the signal, the pattern of the signal being related to at least one of an intensity and a frequency of the signal; and in response to determining that the propagating path of the signal is changed, determining that a touch is applied on the object.

In some implementations, the method further comprises: determining a property of the touch from the pattern of the signal, the property at least indicating a first position of the touch applied on the object; and triggering an event at least based on the first position of the touch.

In some implementations, the property further indicates a pressure of the touch on the object, and the triggering an event comprises: triggering the event based on the first position and the pressure of the touch.

In some implementations, the method further comprises: providing information about the touch applied on the object to a controller of a camera, to enable the camera to determine a location of a touch tool that applies the touch on the object.

In some implementations, the triggering the event comprises: receiving an indication of the location of the touch tool from controller of the camera; calibrating the first position of the touch on the object to a second position based on the received indication; and triggering the event based on the second position.

What is claimed is:
1. A device, comprising:
a processing unit; and
a memory coupled to the processing unit and storing instructions that, when executed by the processing unit, causes the device to perform operations, comprising:
receiving a signal corresponding to a mechanical wave propagating in an object;
determining whether a propagating path of the mechanical wave in the object is changed by detecting a pattern of the signal, the pattern of the signal being related to at least one of an intensity and a frequency of the signal; and
based on determining that the propagating path of the signal is changed, determining a location of a touch on the object and an amount of pressure of the touch on the object.

2. The device of claim 1, further comprising instructions for:
  causing an actuator to generate the mechanical wave propagating in the object.

3. The device of claim 2, wherein causing the actuator to generate the mechanical wave comprises:
  causing the actuator to generate the mechanical wave having a plurality of frequency components in a range of 16 kHz to 20 kHz.

4. The device of claim 1, further comprising instructions for:
  triggering an event at least based on the location of the touch.

5. The device of claim 4, wherein triggering the event comprises:
  determining, based on the pattern of the signal, a region from a plurality of regions on the object, each of the plurality of regions being associated with at least one pattern; and
  triggering the event based on the determined region.

6. The device of claim 5, wherein the touch is a part of a gesture and triggering the event based on the determined region comprises:
  determining, from the plurality of regions, at least one previous region in which at least one previous touch is applied, the at least one previous touch being a previous part of the gesture; and
  triggering the event based on the determined region and the at least one previous region.

7. The device of claim 4, further comprising instructions for:
  providing information about the touch applied on the object to a controller of a camera, to enable the camera to determine a location of a touch tool that applies the touch on the object.

8. The device of claim 7, wherein triggering the event comprises:
  receiving an indication of the location of the touch tool from controller of the camera;
  calibrating the location of the touch on the object to a second location based on the received indication; and
  triggering the event based on the second location.

9. A computer-implemented method, comprising:
  receiving a signal corresponding to a mechanical wave propagating in an object;
  determining whether a propagating path of the mechanical wave in the object is changed by detecting a pattern of the signal, the pattern of the signal being related to at least one of an intensity and a frequency of the signal; and
  based on determining that the propagating path of the signal is changed, determining a location of a touch on the object and an amount of pressure of the touch applied on the object.

10. The method of claim 9, further comprising:
  triggering an event at least based, at least in part, on the location of the touch.

11. The method of claim 9, further comprising:
  triggering the event based, at least in part, on the location of the touch and the pressure of the touch.

12. The method of claim 10, further comprising:
  providing information about the touch applied on the object to a controller of a camera, to enable the camera to determine a location of a touch tool that applies the touch on the object.

13. The method of claim 12, wherein triggering the event comprises:
  receiving an indication of the location of the touch tool from controller of the camera;
  calibrating the location of the touch on the object to a second position based on the received indication; and
  triggering the event based on the second position.

14. A method, comprising:
  providing a mechanical wave on an object, the object having no native display capabilities;
  detecting, based at least in part, on a pattern associated with the mechanical wave, an amount of pressure of a touch and a location of the touch on the object; and
  generating a signal that represents a change in the pattern caused by the pressure of the touch and the location of the touch on the object; and
  providing the signal to a computing device to cause the computing device to execute an action associated with the touch.

15. The method of claim 14, wherein the mechanical wave has a plurality of frequency components within a range of 16 kHz to 20 kHz.

16. The method of claim 14, wherein the object is associated with an actuator.

17. The method of claim 16, wherein the actuator is detachably arranged on a surface of the object.

18. The method of claim 14, further comprising providing a haptic response at the location of the touch on the object.

19. The method of claim 14, further comprising:
  a fixing component arranged in a proximity of the surface of the object for introducing asymmetry to the surface of the object.

20. The method of claim 14, further comprising:
  executing an action based, at least in part, on the location of the touch and the pressure of the touch on the object.

* * * * *